Jan. 16, 1934. H. E. HEIGHTON 1,943,433
FAIRLEAD FOR CABLES AND THE LIKE
Filed July 27, 1932
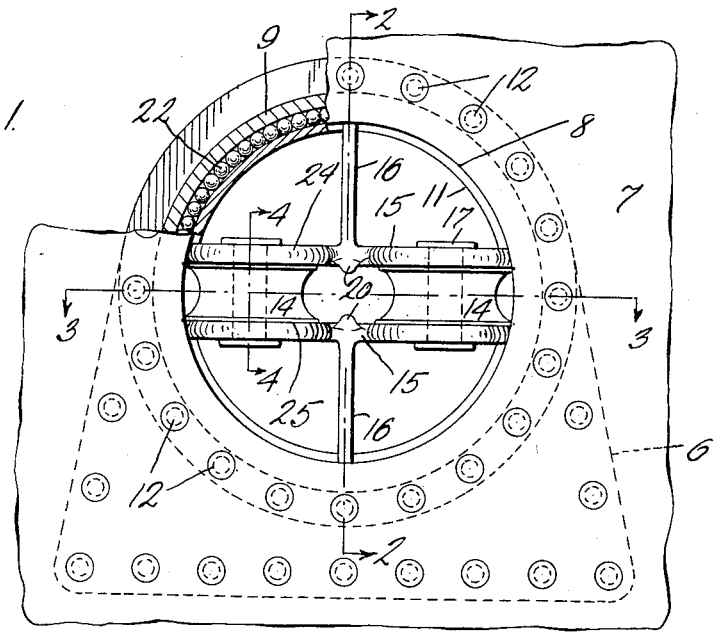
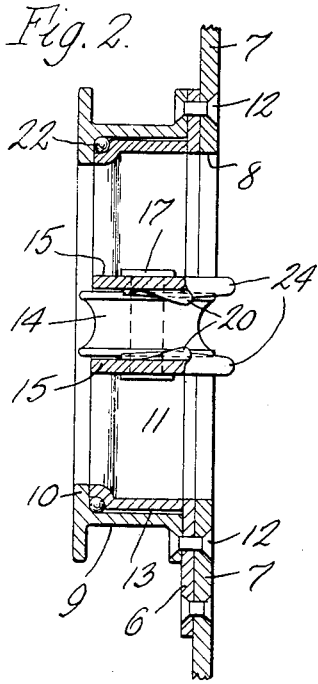
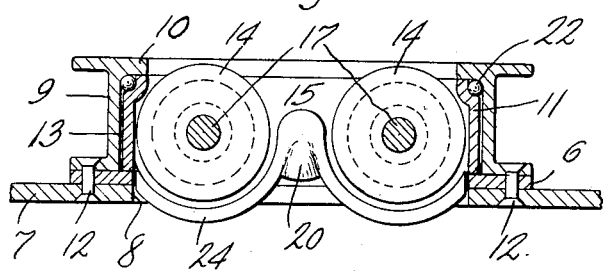
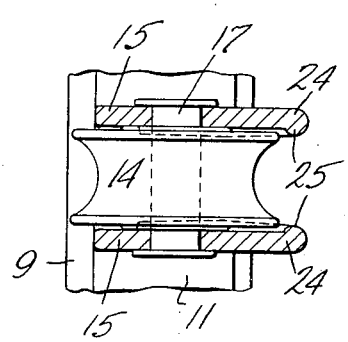
INVENTOR.
Henry Edric Heighton
by
Parker, Groschnow & Kirmer
ATTORNEYS.

Patented Jan. 16, 1934

1,943,433

UNITED STATES PATENT OFFICE 1,943,433

FAIRLEAD FOR CABLES AND THE LIKE

Henry Edric Heighton, Port Colborne, Ontario, Canada, assignor to Port Colborne Iron Works, Port Colborne, Ontario, Canada Application July 27, 1932. Serial No. 625,176

9 Claims. (Cl. 254—190)

This invention relates to fairleads for cables, ropes, and similar tension members.

The objects of this invention are to provide a fairlead of improved construction which is arranged to lead automatically in any direction in which tension is applied to the cable; also to provide a fairlead of this kind which is so constructed that the tendency of the fairlead to bind in the bearings is greatly reduced or entirely overcome; also to provide a fairlead with means of improved construction for guiding a cable into the groove of a sheave; also to improve fairleads in other respects hereinafter specified.

In the accompanying drawing:

Fig. 1 is an elevation partly in section of a fairlead embodying this invention.

Fig. 2 is a central sectional elevation thereof, on line 2—2, Fig. 1.

Fig. 3 is a central sectional view thereof, on line 3—3, Fig. 1.

Fig. 4 is a fragmentary sectional elevation thereof, on line 4—4, Fig. 1.

The fair lead includes an outer support or frame member which may be of any suitable or desired construction, that shown including a flat plate member 6, which may be supplied with a suitable base (not shown) for securing this plate in an upright position to the deck of a boat, or, as in the particular construction shown, such base may be omitted when the fairlead is secured to a side plate 7 of a ship, the side plate having a circular hole or opening 8 cut therein to correspond with a similar hole or opening in the plate 6. The frame or support of the fairlead also includes a bearing member 9 which may be in the form of a steel casting having a substantially cylindrical inner bearing surface and a flange 10, which, together with the inner edge portion of the plate 6 serve to rotatably confine a housing member 11 within the bearing member. The plate 6 and bearing member 9 may be rigidly secured together in any suitable or desired manner, for example, by means of rivets 12, as shown.

The housing member 11 is of circular form and has its outer periphery journalled in the frame or support of the fairlead. The housing member, therefore, includes a substantially cylindrical outer bearing part 13 cooperating with the bearing member 9 and constituting the outer peripheral portion of the housing member. The housing member is formed to receive one or more sheaves 14, two such sheaves being shown in the construction illustrated. Each of these sheaves is journalled to rotate in the plane of the axis of rotation of the housing member and is arranged between the axis of the housing member and the peripheral portion thereof. In the construction shown, the two sheaves are arranged between webs 15 extending at opposite sides of the axis of the rotary housing member from the peripheral portion 13 of the housing member. Cross webs 16 may be employed extending from the peripheral portion 13 to the middle portions of the webs 15, and pivot pins 17 for the sheaves 14 are carried by the webs 15. A housing member of other construction may, of course, be provided, but it is desirable that the sheaves lie entirely within the peripheral portion 13 of the housing.

The middle or axial portion of the housing member 11 is provided with an opening through which a cable or the like may extend. Peripheral portions of the sheaves 14 partly bound the central opening as clearly shown in Fig. 1, and other portions of the opening are bounded by parts of the web members 15. These parts are preferably formed so that any cable contacting with the same will be guided or directed into engagement with one or another of the sheaves, and in the construction shown, tapering projections 20 are provided on the web portions 15 which extend inwardly toward the axis of the housing member 11. It will be clear from Fig. 1 that if a cable passing through the central opening in the housing member should exert a force directly downwardly on the lower projecting part 20, such cable would be guided to either one side or the other of this opening toward a sheave, and after passing sideways from the center of the opening in the rotary housing member, the pull of the cable will exert a force that tends to rotate the housing in its bearing so that the cable will enter the groove in the periphery of the sheave. The rotary housing member will continue to turn until the pivot pin 17 of the sheave will extend substantially at right angles to the direction of the pull on the cable. Obviously, if the direction of pull on the cable changes, as for example when the ship is being raised or lowered in the locks of a canal, the housing member 11 will turn to correspond to such change, so that the cable will always bear correctly on the sheave 14, thus enabling this sheave to turn with the minimum of friction and the minimum tendency to bind on its pivot pin and also chafing or wearing on the cable is, consequently, greatly reduced.

In order to facilitate the turning of the housing member, in its support, a rolling contact bearing is preferably provided, and I have found that this bearing is most effective if located on the inboard side of the housing and support. A ball bearing 22 is shown in the construction illustrated at the inboard side of the peripheral portion 13 of the housing. This location of the rolling contact bearing is desirable, for the reason that when the portion of the cable extending outwardly from the fairlead is arranged at any angle with reference to the axis of rotation of the housing 11, any pull on the cable will cause a force to be exerted on the housing member substantially in a direction toward the rolling contact bearing 22. Without the provision of a rolling contact bearing, a force in acting in this direction would tend to cause a sliding contact bearing to bind.

The outboard edges of the webs 15 are preferably extended outwardly beyond the edges of the sheaves 14, as indicated by the flanges 24 and these flanges preferably have their inner faces overhanging the sheaves slightly as indicated at 25 to insure a proper guide of the cable into engagement with the pulleys 14. It will also be clear from an inspection of Fig. 1 that these flanges 24 co-acting with a cable will tend to swing the housing member 11 about its axis until the cable will lead correctly over one or other of the sheaves 14.

From the foregoing description, it will be observed that a fairlead has been produced which is simple in construction, easy and positive in operation and automatically adjustable to any direction, thus eliminating, amongst other disadvantages, the usual wear of cables and ropes thus employed and the necessity of manual attendance. The unitary rotatable housing carrying the sheaves and the means for directing the cable into the sheaves may be mounted in any desired type of frame, but the latter must be such as will permit the free movement of the housing under the influence of the tension exerted on the cable.

It will be noted that while the present invention is particularly well adapted for use in connection with the mooring cables of ships, it is, of course, equally as well adapted for use in leading cables or ropes under many other conditions.

The detail construction of the support or frame and of the housing may be varied in many respects without departing from the spirit or scope of the invention as defined in the appended claims.

I claim as my invention:

1. A fairlead for cables and the like, comprising a support, a housing rotatably mounted in said support, a plurality of sheaves carried by said housing and arranged beyond the center of said housing, each sheave being rotatable in a plane of the axis of rotation of said housing, and means extending into the space between said sheaves for guiding a cable into engagement with a sheave when tension is applied to the cable.

2. A fairlead for cables, ropes and the like, comprising a support, a housing rotatably mounted within said support, a pair of cable-guiding sheaves carried by said housing and arranged at opposite sides and spaced from the center of rotation of said housing, and means extending into the space between said sheaves and closer to said center than the faces of said sheaves, whereby a cable will be directed into either of said sheaves when said cable is drawn taut.

3. A self-aligning fairlead for cables, ropes and the like, comprising a support, a housing rotatably mounted within said support, cable-guiding sheaves carried by and rotatable with said housing and spaced from the center of rotation of said housing, said housing having portions extending into the space between said sheaves to direct a cable into one of said sheaves when said cable is drawn taut.

4. A fairlead for cables and the like, comprising a support, a housing having a central opening for a cable and mounted in said support to rotate about said opening, sheaves journalled in said housing at a distance from said central opening and having their peripheries extend toward but spaced from the center of said housing, and means extending between adjacent edge portions of said sheaves at said central opening for guiding a cable into engagement with one of said sheaves, the force of the cable on a sheave tending to turn said housing into a position in which said force acts substantially perpendicular to the axis of rotation of the sheave.

5. A fairlead for cables and the like, comprising a support having a bearing formed therein, a housing rotatably mounted in said bearing and having a central aperture through which a cable can be led, and a sheave journalled in said housing within said bearing and rotatable in a plane of the axis of said housing, said sheave being located between the axis of said housing and said bearing and spaced from the axis of said housing and forming a portion of the boundary of said aperture, the portions of said housing bounding said aperture being arranged closer to said axis than the peripheral portion of said sheave and diverging from said axis toward said sheave, whereby force exerted on said sheave by a cable will tend to turn said housing until the axis of said pulley is at right angles to said force.

6. A fairlead comprising a support, a housing rotatably mounted within said support, and a plurality of sheaves carried by said housing and arranged between the axis and periphery of said housing, each of said sheaves being rotatable in a plane of the axis of the housing, said housing having an axial opening partly bounded by the peripheries of said sheaves, and portions of said housing projecting into said axial opening and formed to direct a cable under tension into engagement with one of said sheaves.

7. A fairlead for cables and the like, comprising a support having a bearing formed therein, a housing rotatably mounted in said bearing, and a sheave journalled in said housing within said bearing and rotatable in a plane of the axis of said housing, said sheave being located between the axis of said housing and said bearing and spaced from the axis of said housing, and flanges on said housing extending outwardly at opposite sides of said sheaves and beyond the peripheral portions of said sheaves to relieve the edges of the sheaves from strains by the outer lead of the cable.

8. A fairlead for cables and the like, comprising a support, a housing having its peripheral portion journalled in said support, a sheave journalled in said housing and rotatable in a plane of the axis of said housing and located between the axis and peripheral portion of said housing and spaced from said axis, and a ball bearing between said support and said housing at the inboard portion thereof.

9. A fairlead for cables and the like, comprising a support, a housing having its peripheral portion journalled in said support, a sheave journalled in said housing and rotatable in a plane of the axis of said housing and located between the axis and peripheral portion of said housing and spaced from said axis, and a rolling contact bearing arranged between said support and housing at the inboard sides only of said housing and support to prevent binding of said bearing.

HENRY EDRIC HEIGHTON.